US 9,643,124 B2

(12) United States Patent
Zhang et al.

(10) Patent No.: US 9,643,124 B2
(45) Date of Patent: May 9, 2017

(54) GAS SEPARATION MEMBRANES BASED ON FLUORINATED AND PERFLUORINATED POLYMERS

(71) Applicants: Hao Zhang, Union City, CA (US); Zhenjie He, Fremont, CA (US); Timothy C Merkel, Menlo Park, CA (US); Yoshiyuki Okamoto, Brooklyn, NY (US); Yasuhiro Koike, Yokohama (JP)

(72) Inventors: Hao Zhang, Union City, CA (US); Zhenjie He, Fremont, CA (US); Timothy C Merkel, Menlo Park, CA (US); Yoshiyuki Okamoto, Brooklyn, NY (US); Yasuhiro Koike, Yokohama (JP)

(73) Assignee: Membrane Technology and Research, Inc., Newark, CA (US)

( * ) Notice: Subject to any disclaimer, the term of this patent is extended or adjusted under 35 U.S.C. 154(b) by 0 days.

(21) Appl. No.: 14/921,382

(22) Filed: Oct. 23, 2015

(65) Prior Publication Data

US 2016/0045859 A1    Feb. 18, 2016

Related U.S. Application Data

(60) Continuation-in-part of application No. 14/330,714, filed on Jul. 14, 2014, now Pat. No. 9,403,120, which is a division of application No. 14/184,308, filed on Feb. 19, 2014, now Pat. No. 8,828,121.

(60) Provisional application No. 62/068,176, filed on Oct. 24, 2014.

(51) Int. Cl.
   *B01D 53/22*     (2006.01)
   *B01D 71/32*     (2006.01)

(52) U.S. Cl.
   CPC ........... *B01D 53/228* (2013.01); *B01D 71/32* (2013.01); *B01D 2256/245* (2013.01); *B01D 2257/102* (2013.01); *B01D 2257/108* (2013.01); *B01D 2257/11* (2013.01); *B01D 2257/504* (2013.01); *Y02C 10/10* (2013.01)

(58) Field of Classification Search
   CPC ...... B01D 53/22; B01D 53/228; B01D 71/06; B01D 71/32; B01D 2256/245; B01D 2257/102; B01D 2257/108; B01D 2257/11; B01D 2257/504
   See application file for complete search history.

(56) References Cited

U.S. PATENT DOCUMENTS

| 3,133,132 A | 5/1964 | Loeb et al. |
| 3,307,330 A * | 3/1967 | Niedzielski ............ B01D 53/22 95/45 |
| 3,308,107 A | 3/1967 | Selman et al. |
| 4,230,463 A | 10/1980 | Henis et al. |
| 4,243,701 A | 1/1981 | Riley et al. |
| 4,863,761 A | 9/1989 | Puri |
| 5,051,114 A * | 9/1991 | Nemser ............... B01D 53/228 95/47 |
| 5,141,642 A | 8/1992 | Kusuki et al. |
| 5,156,888 A | 10/1992 | Haubs et al. |
| 5,242,636 A | 9/1993 | Sluma et al. |
| 5,318,417 A | 6/1994 | Kopp et al. |
| 5,408,020 A | 4/1995 | Hung et al. |
| 6,361,582 B1 | 3/2002 | Pinnau et al. |
| 6,361,583 B1 | 3/2002 | Pinnau et al. |
| 6,544,316 B2 | 4/2003 | Baker et al. |
| 6,572,679 B2 | 6/2003 | Baker et al. |
| 6,572,680 B2 | 6/2003 | Baker et al. |
| 6,579,341 B2 | 6/2003 | Baker et al. |
| 6,592,650 B2 | 7/2003 | Pinnau et al. |
| 7,582,714 B2 | 9/2009 | Okamoto et al. |
| 7,635,780 B2 | 12/2009 | Okamoto et al. |
| 7,690,514 B2 | 4/2010 | McKeown et al. |
| 7,754,901 B2 | 7/2010 | Okamoto et al. |
| 8,056,732 B2 | 11/2011 | McKeown et al. |
| 8,168,808 B2 | 5/2012 | Okamoto et al. |
| 8,575,414 B2 | 11/2013 | Liu et al. |
| 8,686,104 B2 | 4/2014 | Du et al. |
| 8,828,121 B1 * | 9/2014 | He .................... B01D 71/32 95/45 |
| 9,403,120 B2 * | 8/2016 | He .................... B01D 71/32 |

(Continued)

FOREIGN PATENT DOCUMENTS

| JP | 4032738 B2 | 1/2008 | |
| WO | WO 2010/080753 A1 * | 7/2010 | ............ B01D 39/16 |
| WO | WO2010080753 A1 | 7/2010 | |

OTHER PUBLICATIONS

Yang, et al, "Novel Amorphous Perfluorocopolymeric System; Copolymers of Perfluoro-2-methylene-1,3-dioxolane Derivatives," Journal of Polymer Science, vol. 44, pp. 1613-1618 (2006).

Liu, et al., Synthesis and Radical Polymerization of Perfluoro-2-methylene-1,3-dioxolanes, Macromolecules, vol. 38, pp. 9466-9478 (2005).

Koike, et al, Synthesis and Characterization of Copolymers of Perfluoro(2-methylene-4,5-dimethyl-1,3-dioxolane) and Perfluoro(2-methylene-1,3-dioxolane), Journal of Fluorine Chemistry, vol. 156, pp. 198-202 (2013).

Mikes, et al, Characterization and Properties of Semicrystalline and Amorphous Perfluoropolymer: Poly(perfluoro-2- methylene-1,3-dioxolane), Polym. Adv. Technol. vol. 22, pp. 1272-1277 (2011).

Paul and Chio, "Gas Permeation in a Dry Nafion Membrane," Industrial and Engineering Chemistry Research, Inc., vol. 27, pp. 2161-2164 (1988).

(Continued)

*Primary Examiner* — Jason M Greene
(74) *Attorney, Agent, or Firm* — Timothy A. Hott

(57) ABSTRACT

A process for separating components of a gas mixture using gas-separation copolymer membranes. These membranes use a selective layer made from copolymers of partially fluorinated or perfluorinated dioxolane monomers and a second monomer, such as dioxane or a partially fluorinated dioxolane. The resulting membranes have superior selectivity performance for gas pairs of interest while maintaining fast gas permeance compared to membranes prepared using conventional perfluoropolymers, such as Teflon® AF, Hyflon® AD, and Cytop®.

16 Claims, No Drawings

(56) References Cited

U.S. PATENT DOCUMENTS

| | | | | |
|---|---|---|---|---|
| 2006/0246273 | A1* | 11/2006 | McKeown | B01D 53/228 428/314.8 |
| 2012/0190091 | A1* | 7/2012 | Huang | B01D 53/228 435/161 |
| 2015/0231555 | A1 | 8/2015 | He et al. | |
| 2016/0236141 | A1* | 8/2016 | Merkel | B01D 53/228 |

OTHER PUBLICATIONS

Okamoto, et al, "Synthesis and Properties of Amorphous Perfluorinated Polymers," Chemistry Today, vol. 27, pp. 46-48 (2009).

Nakagawa, T., "Industrial Applications of Membranes for Gas Separation in Japan," in Polymeric Gas Separation Membranes, Ed. D.R. Paul and Y.P. Yampol'skii, pp. 399-439. Boca Raton, CRC Press (1994).

Liu, et al., Free-Radical Polymerization of Dioxolane and Dioxane Derivatives: Effect of Fluorine Substituents on the Ring Opening Polymerization, Journal of Polymer Science Part A: Polymer Chemistry, vol. 42, pp. 5180-5188 (2004).

Okamoto, et al. New Perfluoro-Dioxolane-Based Membranes for Gas Separations, Journal of Membrane Science, vol. 471, pp. 412-419 (2014).

Written Opinion of the International Searching Authority, mailed Aug. 2, 2016, for PCT/US2016/017365, filed Oct. 2, 2016.

* cited by examiner

GAS SEPARATION MEMBRANES BASED ON FLUORINATED AND PERFLUORINATED POLYMERS

CROSS-REFERENCE TO RELATED APPLICATION

This application is a non-provisional application and claims the benefit of U.S. Provisional Patent Application No. 62/068,176, filed on Oct. 24, 2014, and is a continuation-in-part and claims the benefit of U.S. application Ser. No. 14/330,714, filed on Jul. 14, 2014, which issued as U.S. Pat. No. 9,403,120 on Aug. 2, 2016, which is a continuation and claims the benefit of U.S. application Ser. No. 14/184,308, filed on Feb. 19, 2014, which issued as U.S. Pat. No. 8,828,121 on Sep. 9, 2014, which are hereby incorporated by reference in their entireties.

STATEMENT OF GOVERNMENTAL SUPPORT

This invention was made with government support under Grant No. IIP-1449053 awarded by the National Science Foundation. The government has certain rights in the invention.

FIELD OF THE INVENTION

The invention relates to membrane-based gas separation processes. In particular, the invention relates to gas separation processes using copolymer membranes containing partially fluorinated or perfluorinated monomers.

BACKGROUND OF THE INVENTION

Presented below is background information on certain aspects of the present invention as they may relate to technical features referred to in the detailed description, but not necessarily described in detail. The discussion below should not be construed as an admission as to the relevance of the information to the claimed invention or the prior art effect of the material described.

The search for a membrane for use in gas separation applications that combines high selectivity with high flux continues. Current perfluoropolymer membranes, such as those made from Hyflon® AD (Solvay), Teflon® AF (Du Pont), Cytop® (Asahi Glass), and variants thereof, have excellent chemical resistance and stability. We reported earlier, in U.S. Pat. No. 6,361,583, membranes that are made from glassy polymers or copolymers, including Hyflon® AD, and are characterized by having repeating units of a fluorinated, cyclic structure. In general, the ring structures in these materials frustrate polymer chain packing yielding amorphous polymers with relatively high gas permeability. These developed membranes are also more resistant to plasticization by hydrocarbons than prior art membranes and are able to recover from accidental exposure to liquid hydrocarbons.

It is known that copolymerization of fluorinated cyclic monomers with tetrafluoroethylene (TFE) enhances the chemical resistance and physical rigidity of membranes. TFE is also known to improve processability and has the effect of lowering gas permeability and increasing size selectivity in Hyflon® AD and Teflon® AF. Therefore, combinations of TFE with other monomer units, in particular perfluorinated dioxoles, such as Teflon® AF and Hyflon® AD, that result in overall amorphous, yet rigid, highly fluorinated, copolymers are preferred for industrial membrane applications. However, a drawback to these membranes is that their selectivities are relatively low for a number of gas pairs of interest, including $H_2/CH_4$, $He/CH_4$, $CO_2/CH_4$, and $N_2/CH_4$.

Other than the commercially available perfluoropolymers, there is very limited gas transport data available for fully fluorinated polymers. Paul and Chio, "Gas permeation in a dry Nafion membrane," Industrial & Engineering Chemistry Research, 27, 2161-2164 (1988), examined gas transport in dry Nafion® (an ionic copolymer of TFE and sulfonated perfluorovinyl ether) and found relatively high permeabilities and selectivities for several gas pairs ($He/CH_4$, $He/H_2$, and $N_2/CH_4$) compared to conventional hydrocarbon-based polymers considered for membrane applications. Nafion® and related ionic materials are used to make ion exchange membranes for electrochemical cells and the like. Because of their high cost and need for carefully controlled operating conditions, such as adjusting the relative humidity of the feed gas to prevent polymer swelling and loss of performance, these ionic membranes are not suitable for industrial gas separations.

Despite the improvements described above, there remains a need for better gas separation membranes, and specifically for improved membranes combining high flux, high selectivity, and good chemical resistance.

Recently, there have been reports of a new class of non-ionic amorphous perfluoropolymers. U.S. Pat. Nos. 7,582,714; 7,635,780; 7,754,901; and 8,168,808, all to Yoshiyuki Okamoto, disclose compositions and processes for making perfluoro-2-methylene-1,3-dioxolane derivatives.

Yang et al., "Novel Amorphous Perfluorocopolymeric System: Copolymers of Perfluoro-2-methylene-1,3-dioxolane Derivatives," Journal of Polymer Science: Part A: Polymer Chemistry, Vol. 44, 1613-1618 (2006), and Okamoto et al., "Synthesis and properties of amorphous perfluorinated polymers," Chemistry Today, vol. 27, n. 4, pp. 46-48 (July-August 2009), disclose the copolymerization of two dioxolane derivatives, perfluorotetrahydro-2-methylene-furo[3,4,-d][1,3]dioxolane and perfluoro-2-methylene-4-methoxymethyl-1,3-dioxolane. The copolymers were found to be thermally stable, have low refractive indices, and high optical transparency from UV to near-infrared, making them ideal candidates for use in optical and electrical materials.

U.S. Pat. No. 3,308,107, to Du Pont, discloses a similar dioxolane derivative, perfluoro-2-methylene-4-methyl-1,3-dioxolane. Homopolymers and copolymers of perfluoro-2-methylene-4-methyl-1,3-dioxolane with TFE are also disclosed.

U.S. Pat. No. 5,051,114, also to Du Pont, discloses the testing of poly-[perfluoro-2-methylene-4-methyl-1,3-dioxolane] for use in a membrane for gas separation. The results indicated that this material exhibited gas permeabilities 2.5 to 40 times lower as compared to dipolymer membranes of perfluoro-2,2-dimethyl-1,3-dioxole and TFE, but had higher selectivities.

Co-owned U.S. Pat. No. 8,828,121 discloses a process for separating components of a gas mixture using a membrane having a selective layer formed from a copolymer of perfluorodioxolane monomers.

Liu et al., "Free-Radical Polymerization of Dioxolane and Dioxane Derivatives: Effect of Fluorine Substituents on the Ring Opening Polymerization," Journal of Polymer Science: Part A: Polymer Chemistry, Vol. 42, 5180-5188 (2004), discloses the synthesis of partially- and fully-fluorinated dioxolane and dioxane monomers that may be used in materials for optical fiber applications.

U.S. Pat. Nos. 7,690,514 and 8,056,732, both to McKeown et al. and U.S. Pat. No. 8,575,414, to UOP, LLC, and U.S. Pat. No. 8,686,104, to Du et al., disclose the use of dioxanes in the development of membranes for pervaporation and gas separation that are prepared from polymers of intrinsic microporosity (or PIMs). These PIMs have rigid and contorted structures that frustrate packing and increase high-free volume, which results in membranes with increased permeability and increased selectivity for certain gas pairs.

To date, however, there have been no studies copolymerizing the perfluorodioxolane monomers described by Yang et al. and Okamoto et al. with a perfluorinated dioxane monomer, such as those disclosed in Liu et al., for use in membranes for gas separation processes.

SUMMARY OF THE INVENTION

The present invention relates to a process for separating components of a gas mixture whereby the gas mixture is passed across an improved separation membrane having a selective layer formed from a copolymer comprising of at least one dioxolane monomer and a second monomer.

In a basic embodiment, the invention is a process for separating two components, A and B, of a gas mixture having a ratio (Rf) of A:B, comprising:

(a) passing the gas mixture across a separation membrane having a feed side and a permeate side, the separation membrane having a selective layer comprising a copolymer comprising a first dioxolane monomer and second monomer;

(b) providing a driving force for transmembrane permeation;

(c) withdrawing from the permeate side a permeate stream having a ratio (Rp) of A:B, where Rp>Rf; and (d) withdrawing from the feed side a residue stream having a ratio (Rr) of A:B, where Rr<Rf.

Membranes previously developed for gas separation processes have incorporated the use of amorphous homopolymers of perfluorinated dioxoles, dioxolanes, or cyclic acid ethers, or copolymers of these with tetrafluoroethylene. However, these membranes lack adequate selectivity for certain gas separations, such as treatment of natural gas.

To address these performance issues, we previously examined the properties of certain specific dioxolane copolymers incorporating at least two perfluorinated dioxolane monomers of differing crystallinity. In particular, we discovered that copolymers of Monomer H with other monomers listed in Table 1, below, could be used as the selective layer in composite membranes having improved gas separation properties.

TABLE 1

Perfluorodioxolane Monomers

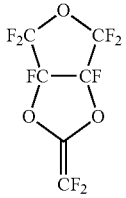

Perfluoro-2-methylene-furo[3,4-d][1,3]-dioxolane (Monomer A)

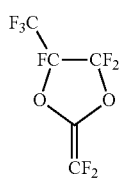

Perfluoro-2-methylene-4-methyl-1,3,-dioxolane (Monomer B)

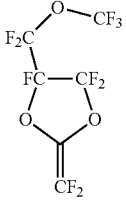

Perfluoro-2-methylene-4-methoxymethyl-1,3-dioxolane (Monomer C)

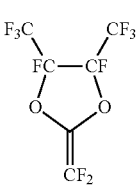

Perfluoro-2-methylene-4,5-dimethyl-1,3,-dioxolane (Monomer D)

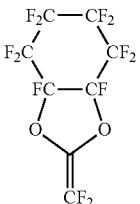

Perfluoro-3-methylene-2,4-dioxabicyclo[4,3,0]nonane (Monomer E)

TABLE 1-continued

Perfluorodioxolane Monomers (Monomer F)

Perfluoro-3-methylene-2,4-dioxabicyclo-[3,3,0]octane (Monomer G)

Perfluoro-2-methylene-4,5-dimethoxymethyl-1,3-dioxolane (Monomer H)

Perfluoro-2-methylene-1,3-dioxalane

Subsequent consideration and study of these materials has indicated that polymers incorporating even one dioxolane monomer may have special properties, including useful and stable gas separation properties. Thus, our present invention is directed to gas separation membranes and gas separation processes that rely on a selective layer comprising a copolymer incorporating at least one dioxolane monomer.

Further, in our previous work we studied only perfluorinated dioxolanes, as shown in Table 1, where all of the carbon-hydrogen bonds have been replaced by carbon-fluorine bonds. We now believe that, in some aspects of the invention, it may be preferred to use partially-fluorinated dioxolane monomers, where at least one carbon-hydrogen bond is replaced by a carbon-fluorine one.

Accordingly, in one embodiment, the invention is a process for separating two components, A and B, of a gas mixture having a ratio (Rf) of A:B, comprising:

(b) passing the gas mixture across a separation membrane having a feed side and a permeate side, the separation membrane having a selective layer comprising a copolymer comprising a first dioxolane monomer having the formula

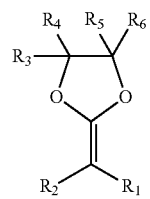

wherein $R_1$, $R_2$, $R_3$, $R_4$, $R_5$ and $R_6$ are each independently hydrogen or fluorine, and a second monomer;

(b) providing a driving force for transmembrane permeation;

(c) withdrawing from the permeate side a permeate stream having a ratio (Rp) of A:B, where Rp>Rf; and (d) withdrawing from the feed side a residue stream having a ratio (Rr) of A:B, where Rr<Rf.

An important feature of the present invention is to balance the crystalline and amorphous phases of the copolymer material. If the copolymer is too crystalline or tightly packed, the membrane selective layer may have undesirably low permeability. Conversely, a looser, open or more flexible structure may result in a membrane with high fluxes, but poor selectivity. Therefore, the second monomer should be one that counterbalances the characteristics of the first dioxolane monomer.

To this end, in certain aspects, the second monomer may be a second dioxolane. Representative, non-limiting dioxolanes may be selected from the group consisting of the structures found in Table 1, above. The second dioxolane may be perfluorinated, as shown, for example, in Table 1, or may be partially fluorinated, having at least one hydrogen atom replaced by a fluorine atom.

In other aspects, the second monomer may be a dioxane. Examples of representative, non-limiting dioxanes are those shown in Table 2, below:

TABLE 2

Perfluorodioxane Monomers

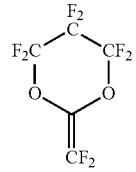

Perfluoro-2-methylene-1,3-dioxane

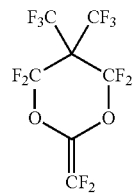

Perfluoro-2-methylene-5,5-dimethyl-1,3-dioxane

TABLE 2-continued

Perfluorodioxane Monomers

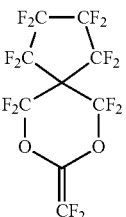

Perfluoro-2-methylene-5-cyclopentyl-1,3-dioxane

Just as with the dioxolane monomer, the dioxane component may be only partially fluorinated or fully fluorinated. Therefore, in certain embodiments, the monomers selected to prepare the material comprising the membrane selective layer may be a combination of partially fluorinated or perfluorinated dioxolanes and partially fluorinated or perfluorinated dioxanes.

In some aspects, the second monomer may be tetrafluoroethylene (TFE).

Depending on the specific properties of the first dioxolane monomer that is used, and the comonomer with which it is polymerized, the resulting copolymer may have a glass transition temperature Tg(c) that is higher or lower than the glass transition temperature of a homopolymer, Tg(h), of the first dioxolane monomer. In general, the second monomer is used to raise the glass transition temperature of the most crystalline, rigid dioxolanes or to lower the glass transition temperature of the most open, flexible materials. For this effect to be of sufficient utility, Tg(c) is normally at least 5° C., preferably 10° C., lower or higher than the Tg(h).

An important advantage of the present invention is that copolymerization of partially or perfluorinated dioxolane monomers with a second monomer, such as a perfluorinated dioxane, in the membrane can result in higher selectivity for desired gases than can be obtained using prior art membranes that incorporate TFE or cyclic perfluorinated homopolymers.

Due to their advantageous properties, the membranes and processes of the invention are useful for many gas separation applications. Specific examples include, but are not limited to the separation of various gases, for example, nitrogen, helium, carbon dioxide, and hydrogen from methane. Such separations are important in natural gas processing, for example.

The gas mixture may contain at least two components, designated component A and component B, that are to be separated from each other and optionally another component or components in the stream. The permeating desired gas may be either a valuable gas that is desired to retrieve as an enriched product, or a contaminant that is desired to remove. Thus, either the permeate stream or the residue stream, or both, may be the useful products of the process.

In certain aspects, the invention is a process for separating two components, A and B, of a gas mixture wherein component A is hydrogen and component B is methane. Such a mixture may be found in a steam reforming process. For example, the process of the invention may be used to recover hydrogen from synthesis gas, to remove carbon dioxide from synthesis gas, or to adjust the ratio of hydrogen to carbon monoxide in synthesis gas.

In certain aspects, the invention is a process for separating two components, A and B, of a gas mixture wherein component A is carbon dioxide and component B is methane. This process may be involved in carbon capture and storage or used in the separation of $CO_2$ from natural gas.

In other aspects, the invention is a process for separating two components, A and B, of a gas mixture wherein component A is nitrogen and component B is methane. This process may be involved in removing nitrogen from nitrogen-contaminated natural gas.

In yet another aspect, the invention is a process for separating two components, A and B, of a gas mixture wherein component A is helium and component B is methane. This process may be useful for producing helium through natural gas extraction and subsequent purification.

BRIEF DESCRIPTION OF THE DRAWINGS

None.

DETAILED DESCRIPTION OF THE INVENTION

The term "gas" as used herein means a gas or a vapor.

The term "polymer" as used herein generally includes, but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to, isotactic and atactic symmetries.

The term "partially fluorinated" as used herein means that at least one hydrogen atom attached to the polymer backbone or side chain is replaced by a fluorine atom.

The term "highly fluorinated" as used herein means that at least 90% of the total number of halogen and hydrogen atoms attached to the polymer backbone or side chains are fluorine atoms.

The terms "fully-fluorinated" and "perfluorinated" as used herein are interchangeable and refer to a compound where all of the available hydrogen bonded to carbon have been replaced by fluorine.

All percentages herein are by volume unless otherwise stated.

The invention relates to a process for separating two components, A and B, of a gas mixture. The separation is carried out by running a stream of the gas mixture across a membrane that is selective for the desired component to be separated from another component. The desired component to be separated into the permeate may be either Component A or Component B. The process results, therefore, in a permeate stream enriched in the desired component and a residue stream depleted in that component.

At least the selective layer responsible for the gas discriminating properties of the membrane is made from a glassy copolymer. The copolymer should be substantially amorphous. Crystalline polymers are typically essentially insoluble and thus render membrane making difficult, as well as exhibiting generally very low gas permeabilities. Crystalline polymers are not normally suitable for the selective layer, therefore.

The selective layer copolymer should be fluorinated, and generally the degree of fluorination should be high to increase the chemical inertness and resistance of the material. By high, we mean having a fluorine:carbon ratio of atoms in the polymer of at least 1:1. Most preferably, the polymer is perfluorinated, even if the perfluorinated structure has less than a 1:1 fluorine:carbon ratio.

Various materials may be used for the copolymeric selective layer to meet the characterizing requirements. These include copolymers comprising a first dioxolane monomer and a second monomer.

The dioxolane monomers as described herein are characterized by a 1,3-dioxolane ring, having the general form:

Preferred dioxolane monomers may be selected from perfluoro-2-methylene-1,3-dioxolane or derivatives thereof containing various substituent groups at the fourth and fifth positions of the dioxolane ring. These monomers are represented by the structures found in Table 1, above.

A homopolymer of perfluoro-2-methylene-1,3-dioxolane (Monomer H) is crystalline in nature, which was confirmed by Mikeš et al., "Characterization and Properties of Semicrystalline and Amorphous Perfluoropolymer: poly(perfluoro-2-methylene-1,3-dioxolane)," Polymers for Advanced Technologies, v. 22, pp. 1272-1277 (2011). This crystallinity reflects the ability of the repeat unit in the homopolymer of Monomer H to pack tightly, forming ordered structures. As a result, Monomer H does not dissolve in fluorinated solvents. However, as described herein, copolymerizing Monomer H, for example, with a second monomer, such as another partially fluorinated dioxolane monomer from Table 1 or a dioxane monomer from Table 2, in the appropriate amount results in an amorphous structure, which is desirable for gas separation membrane materials.

Thus, in some embodiments, the second monomer is a partially fluorinated dioxolane chosen from the group consisting of the monomers found in Table 1, except for Monomer H.

In other embodiments, the second monomer is a dioxane. Preferred dioxane monomers as described herein are characterized by a 1,3-dioxane ring having the general form:

Other dioxane isomers, such as 1,2-dioxane and 1,4-dioxane, may be used as the second monomer, having the general form:

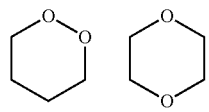

None of the structures in Table 1 are new monomers in themselves. In addition perfluoro-2-methylene-1,3-dioxane and perfluoro-2-methylene-5,5-dimethyl-1,3-dioxane of Table 2 are also not new. However, 2-methylene-5-cyclopentyl-1,3-dioxane is a new monomer and in some embodiments, the present invention relates to a compound represented by the following formula:

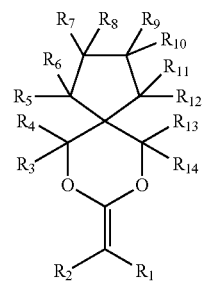

wherein $R_1$-$R_{14}$ are each independently hydrogen, fluorine, or a perfluoroalkyl group having 1 to 7 carbons. A potential synthetic route for perfluoro-2-methylene-5-cyclopentyl-1,3-dioxane is shown below:

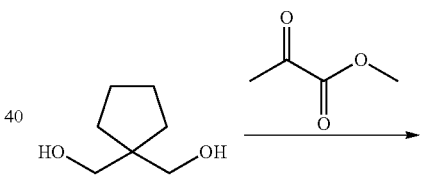

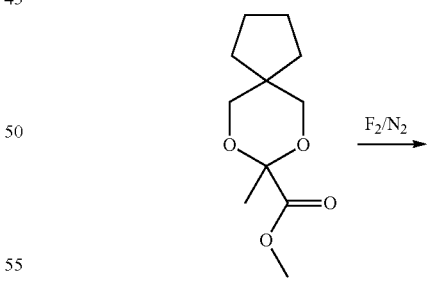

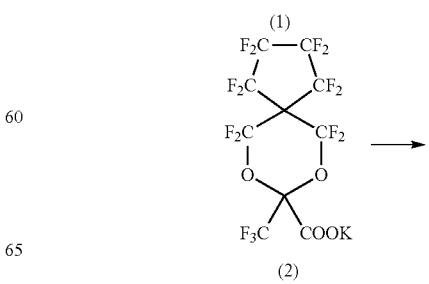

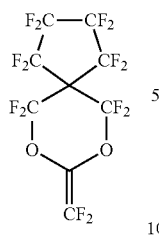

Starting from the condensation between (cyclopentane-1,1-diyl) di-methanol and methyl pyruvate, the bicyclic hydrocarbon precursor (1) is obtained. Precursor (1) can be easily fluorinated and transformed to perfluoro potassium salt (2), the final monomer is obtained via salt (2)'s thermal decomposition.

Generally, dioxanes can be prepared by acetalization of aldehydes and ketalization of ketones with ethylene glycol. Formulations embracing those suitable for use in the invention are described in Liu et al. and U.S. Pat. Nos. 3,308,107; 5,051,114; 7,582,714; 7,635,780; 7,754,901; and 8,168,808, incorporated herein by reference. Preparation of dioxane monomers is also described in Liu et al. The homopolymers and copolymers of the monomers in Table 1 and Table 2 may be prepared by direct fluorination of hydrocarbon precursors and polymerized using perfluoro dibenzoyl peroxide as a free radical initiator to yield a linear polymer, or by another convenient method. The resulting polymers are soluble in fluorinated solvents, such as hexafluorobenzene, perfluorohexane, and fluorinated FC43 (3M™).

With the fluoropolymers described herein, the bonding of the monomers occurs outside the main dioxolane or dioxane ring, typically by breaking of the double methylene bond attached to the second position (or in some cases the third position) in the five- or six-member ring. This process is different than dioxole polymerization, which occurs by the opening of a double bond within a five-member ring.

Copolymerization of the perfluoromonomers of Table 1 and Table 2 is represented by the following exemplary formula:

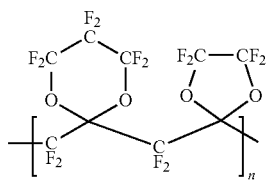

where n is a positive integer.

In other embodiments, the copolymer may comprise more than two partially fluorodioxolane monomers. In certain embodiments, the copolymer may comprise more than one partially fluorinated or perfluorinated dioxane monomers.

In a more preferred embodiment, the separation membrane has a selective layer comprising a copolymer formed from a first dioxolane monomer having the formula

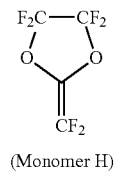

(Monomer H)

and a second monomer that is a dioxane, selected from the group consisting of the structures found in Table 2, above.

In some embodiments, the separation membrane has a selective layer comprising a copolymer formed from a first dioxolane monomer that is partially fluorinated, having the following formula:

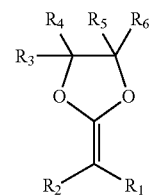

wherein $R_1$, $R_2$, $R_3$, $R_4$, $R_5$ and $R_6$ are each independently hydrogen or fluorine,
and a second dioxolane monomer selected from Table 1, wherein the second dioxolane monomer is not Monomer H.

When any pair of monomers is used, one will tend to be more densely packed and perhaps crystalline than the other, and the respective proportions of the two monomers will alter the membrane properties. Unlike Monomer H, the dioxane monomers of Table 2 are more bulky and frustrate polymer chain packing, yielding a selective layer with higher free volume and higher gas permeability. The resulting copolymer is not as crystalline as a dioxolane homopolymer and has a higher glass transition temperature. Thus, the copolymer has a glass transition temperature, Tg(c), that is higher, at least 5° C. higher, preferably at least 10° C. higher, than a homopolymer made from the first dioxolane monomer having a homopolymer glass transition temperature, Tg(h).

Within the range of amorphous copolymers, there is a trade-off between permeance and selectivity. Relatively large proportions of the second monomer increase permeance at the expense of selectivity, and relatively large proportions of the first dioxolane monomer increase selectivity at the expense of permeance.

In a preferred embodiment, the copolymer is an ideal random copolymer.

In another embodiment, the selective layer of the separation membrane may comprise a copolymer formed from a partially fluorinated dioxolane monomer selected from the group consisting of the structures found in Table 1 and a dioxole monomer, such as those found in Teflon® AF and Hyflon® AD, or a polyperfluoro (alkenyl vinyl ether) monomer, such as that used to make Cytop®.

In yet another embodiment, the selective layer of the separation membrane may comprise a copolymer formed from a partially fluorinated or perfluorinated dioxolane monomer of Table 1 and tetrafluoroethylene (TFE) that does not appreciably crystallize as in the case of a homopolymer.

The copolymer chosen for the selective layer can be used to form films or membranes by any convenient technique known in the art, and may take diverse forms. Because the polymers are glassy and rigid, an unsupported film, tube or fiber of the polymer may be usable in principle as a single-layer membrane. However, such single-layer films will normally be too thick to yield acceptable transmembrane flux, and in practice, the separation membrane usually comprises a very thin selective layer that forms part of a thicker structure. This may be, for example, an integral asymmetric membrane, comprising a dense skin region that forms the selective layer and a microporous support region. Such membranes were originally developed by Loeb and Sourirajan, and their preparation in flat sheet or hollow fiber form is now conventional in the art and is described, for example, in U.S. Pat. No. 3,133,132 to Loeb, and U.S. Pat. No. 4,230,463 to Henis and Tripodi.

As a further, and a preferred, alternative, the membrane may be a composite membrane, that is, a membrane having multiple layers. Modern composite membranes typically comprise a highly permeable but relatively non-selective support membrane, which provides mechanical strength, coated with a thin selective layer of another material that is primarily responsible for the separation properties. Typically, but not necessarily, such a composite membrane is made by solution-casting the support membrane, then solution-coating the selective layer. General preparation techniques for making composite membranes of this type are well known, and are described, for example, in U.S. Pat. No. 4,243,701 to Riley et al., incorporated herein by reference.

Again, the membrane may take flat-sheet, tube or hollow-fiber form. The most preferred support membranes are those with an asymmetric structure, which provides a smooth, comparatively dense surface on which to coat the selective layer. Support membranes are themselves frequently cast onto a backing web of paper or fabric. As an alternative to coating onto a support membrane, it is also possible to make a composite membrane by solution-casting the polymer directly onto a non-removable backing web, as mentioned above. In hollow-fiber form, multilayer composite membranes may be made by a coating procedure as taught, for example, in U.S. Pat. Nos. 4,863,761; 5,242,636; and 5,156,888, or by using a double-capillary spinneret of the type taught in U.S. Pat. Nos. 5,141,642 and 5,318,417.

A gutter layer may optionally be used between the support membrane and the selective layer, for example to smooth the support surface and channel fluid to the support membrane pores. In this case, the support membrane is first coated with the gutter layer, then with the perfluoro selective layer as described herein.

Multiple selective layers may also be used.

The thickness of the selective layer or skin of the membranes can be chosen according to the proposed use, but will generally be no thicker than 5 µm, and typically no thicker than 1 µm. It is preferred that the selective layer be sufficiently thin that the membrane provide a pressure-normalized hydrogen flux, as measured with pure hydrogen gas at 25° C., of at least about 100 GPU (where 1 GPU=1×10$^{-6}$ cm$^3$(STP)/cm$^2$·s·cmHg), more preferably at least about 200 GPU and most preferably at least about 400 GPU. In a preferred embodiment, the selective layer thickness is no greater than about 0.5 µm, and most preferably between about 0.3 µm and 0.5 µm.

Once formed, the membranes exhibit a combination of good mechanical properties, thermal stability, and high chemical resistance. The fluorocarbon polymers that form the selective layer are typically insoluble except in perfluorinated solvents and are resistant to acids, alkalis, oils, low-molecular-weight esters, ethers and ketones, aliphatic and aromatic hydrocarbons, and oxidizing agents, making them suitable for use not only in the presence of $C_{3+}$ hydrocarbons, but in many other hostile environments.

The membranes of the invention may be prepared in any known membrane form and housed in any convenient type of housing and separation unit. We prefer to prepare the membranes in flat-sheet form and to house them in spiral-wound modules. However, flat-sheet membranes may also be mounted in plate-and-frame modules or in any other way. If the membranes are prepared in the form of hollow fibers or tubes, they may be potted in cylindrical housings or otherwise.

The membrane separation unit comprises one or more membrane modules. The number of membrane modules required will vary according to the volume of gas to be treated, the composition of the feed gas, the desired compositions of the permeate and residue streams, the operating pressure of the system, and the available membrane area per module. Systems may contain as few as one membrane module or as many as several hundred or more. The modules may be housed individually in pressure vessels or multiple elements may be mounted together in a sealed housing of appropriate diameter and length.

Of particular importance, the membranes and processes of the invention are useful in applications for producing hydrogen or chemicals from hydrocarbon feedstocks, such as reforming or gasification processes followed by separation or chemical synthesis. Steam reforming is well known in the chemical processing arts, and involves the formation of various gas mixtures commonly known as synthesis gas or syngas from a light hydrocarbon feedstock, steam and optionally other gases, such as air, oxygen or nitrogen. Synthesis gas usually contains at least hydrogen, carbon dioxide, carbon monoxide and methane, but the exact composition can be varied depending on its intended use.

Plant design and process operating conditions thus differ in their details, but the steam reforming process always includes a basic steam/hydrocarbon reforming reaction step, carried out at high temperature and elevated pressure, and one or more subsequent treatments of the raw synthesis gas to remove carbon dioxide or make other adjustments to the gas composition. The processes of the invention are expected to be especially useful in carrying out such treatments.

In another aspect, the invention is a process for separating carbon dioxide from methane, especially if the mixture also contains $C_{3+}$ hydrocarbon vapors. Such a mixture might be encountered during the processing of natural gas, of associated gas from oil wells, or of certain petrochemical streams, for example. The processes of the invention are expected to be useful as part of the gas treatment train, either in the field or at a gas processing plant, for example.

In another aspect, the invention is a process for recovering helium from natural gas. Helium is a rare gas on Earth. Almost all of the commercial helium requirements are supplied by extraction from helium-containing natural gas by low temperature fractional distillation processes. The resulting helium rich gases are further purified or refined using additional cryogenic distillation steps or by pressure swing adsorption (PSA) processes which selectively remove other gases. These final refining steps result in commercial grades of helium in excess of 99.9%. The processes of the invention are expected to be useful in replacing or supplementing one or more of the unit operations in the helium recovery plant.

In yet another aspect, the invention is a process for separating nitrogen from natural gas. The goal will often be to reduce the nitrogen content of the natural gas to no more than about 4% nitrogen, which is an acceptable total inerts value for pipeline gas. In other circumstances, a higher or lower nitrogen target value may be required. Once again, the processes of the invention are expected to be useful in field or plant equipment as stand alone or supplementary units to meet the desired nitrogen concentration target.

Additionally, in another aspect, the invention is a process for separating oxygen from nitrogen. Oxygen is used to enhance the combustion of all fuels, enabling improved burning zone control, and lowering emissions. The present invention is expected to yield enriched oxygen that can be used advantageously in combustion processes, such as kilns, or when using low-grade fuels, where reduction in ballast nitrogen is beneficial.

In a further aspect, the invention is a process for separating water from alcohols, such as ethanol, particularly bioethanol produced from natural sources. A major drawback to more economical use of bioethanol as a fuel is the energy used to grow the feedstock, to ferment it, and to separate a dry ethanol product from the fermentation broth. The processes of the invention are expected to be useful in lowering the energy costs associated with ethanol separation (dehydration).

We claim:

1. A process for separating two components, A and B, of a gas fluid mixture having a ratio (Rf) of A:B, comprising:
   (a) passing the gas mixture across a separation membrane having a feed side and a permeate side, the separation membrane having a selective layer comprising a copolymer comprising a perfluorinated dioxolane monomer and a perfluorinated dioxane monomer;
   (b) providing a driving force for transmembrane permeation;
   (c) withdrawing from the permeate side a permeate stream having a ratio (Rp) of A:B, where Rp>Rf; and
   (d) withdrawing from the feed side a residue stream having a ratio (Rr) of A:B, where Rr<Rf.

2. The process of claim 1, wherein the perfluorinated dioxolane monomer is selected from the group consisting of:

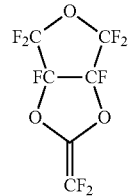

Perfluoro-2-methylene-furo[3,4-d][1,3]-dioxolane (Monomer A)

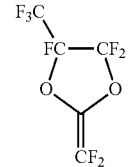

Perfluoro-2-methylene-4-methyl-1,3,-dioxolane (Monomer B)

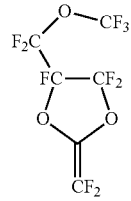

Perfluoro-2-methylene-4-methoxymethyl-1,3-dioxolane (Monomer C)

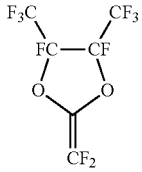

Perfluoro-2-methylene-4,5-dimethyl-1,3,-dioxolane (Monomer D)

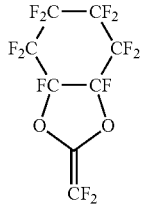

Perfluoro-2-methylene-2,4-dioxabicyclo[4,3,0]nonane (Monomer E)

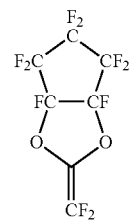

Perfluoro-3-methylene-2,4-dioxabicyclo-[3,3,0] octane (Monomer F)

-continued

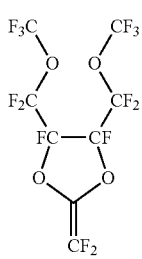

Perfluoro-2-methylene-4,5-dimethoxymethyl-1,3-dioxolane
(Monomer G)

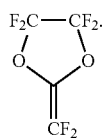

Perfluoro-2-methylene-1,3-dioxolane
(Monomer H)

3. The process of claim 1, wherein the perfluorinated dioxane monomer is selected from the group consisting of:

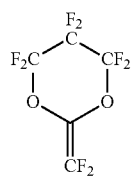

Perfluoro-2-methylene-1,3-dioxane

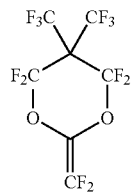

Perfluoro-2-methylene-5,5-dimethyl-1,3-dioxane

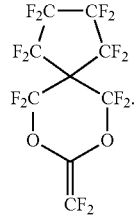

Perfluoro-2-methylene-5-cyclopentyl-1,3-dioxane

4. The process of claim 1, wherein the selective layer comprises a copolymer having the formula:

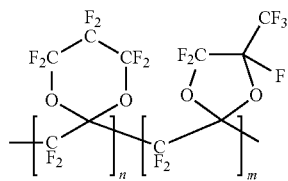

where m and n are positive integers.

5. The process of claim 1, wherein the selective layer comprises a copolymer having the formula:

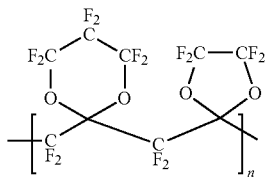

where n is a positive integer.

6. The process of claim 1, wherein the copolymer has a copolymer glass transition temperature, Tg(c), and a homopolymer made from the perfluorinated dioxolane monomer has a homopolymer glass transition temperature, Tg(h), where Tg(c) is at least 10° C. higher than Tg(h).

7. The process of claim 1, wherein component A is hydrogen.

8. The process of claim 1, wherein component A is carbon dioxide.

9. The process of claim 1, wherein component A is nitrogen.

10. The process of claim 1, wherein component A is helium.

11. The process of claim 1, wherein component B is methane.

12. The process of claim 1, wherein the gas mixture further comprises methane and $C_{3+}$ hydrocarbon vapors.

13. The process of claim 1, wherein component A is nitrogen and component B is methane.

14. The process of claim 1, wherein component A is carbon dioxide and component B is methane.

15. The process of claim 1, wherein component A is hydrogen and component B is methane.

16. The process of claim 1, wherein component A is helium and component B is methane.

* * * * *

UNITED STATES PATENT AND TRADEMARK OFFICE
CERTIFICATE OF CORRECTION

| | | |
|---|---|---|
| PATENT NO. | : 9,643,124 B2 | Page 1 of 1 |
| APPLICATION NO. | : 14/921382 | |
| DATED | : May 9, 2017 | |
| INVENTOR(S) | : Hao Zhang et al. | |

It is certified that error appears in the above-identified patent and that said Letters Patent is hereby corrected as shown below:

On the Title Page

Related U.S. Application Data should read:

(60) Continuation-in-part of application No. 14/330,714, filed on Jul. 14, 2014, now Pat. No. 9,403,120, which is a continuation of application No. 14/184,308, filed on Feb. 19, 2014, now Pat. No. 8,828,121

Signed and Sealed this
Fourth Day of July, 2017

Joseph Matal
*Performing the Functions and Duties of the*
*Under Secretary of Commerce for Intellectual Property and*
*Director of the United States Patent and Trademark Office*